(12) United States Patent
Brandt et al.

(10) Patent No.: US 11,275,981 B2
(45) Date of Patent: Mar. 15, 2022

(54) METHOD AND APPARATUS FOR ENCODING AND DECODING CIRCULAR SYMBOLIC CODES (71) Applicant: THE COCA-COLA COMPANY, Atlanta, GA (US)

(72) Inventors: William Patrick Brandt, Decatur, GA (US); Joseph Walter Bechely, IV, Atlanta, GA (US); Lucas Persona, Atlanta, GA (US); Daniel Nicoletti, São Paulo (BR)

(73) Assignee: THE COCA-COLA COMPANY, Atlanta, GA (US)

( * ) Notice: Subject to any disclaimer, the term of this patent is extended or adjusted under 35 U.S.C. 154(b) by 0 days.

(21) Appl. No.: 16/634,669

(22) PCT Filed: Apr. 30, 2018

(86) PCT No.: PCT/US2018/030197
§ 371 (c)(1),
(2) Date: Jan. 28, 2020

(87) PCT Pub. No.: WO2019/022807
PCT Pub. Date: Jan. 31, 2019

(65) Prior Publication Data
US 2020/0394481 A1    Dec. 17, 2020

Related U.S. Application Data

(60) Provisional application No. 62/538,121, filed on Jul. 28, 2017.

(51) Int. Cl.
*G06K 19/06* (2006.01)

(52) U.S. Cl.
CPC ... *G06K 19/06168* (2013.01); *G06K 19/0614* (2013.01); *G06K 19/06075* (2013.01); *G06K 19/06131* (2013.01); *G06K 19/06103* (2013.01)

(58) Field of Classification Search
CPC ....... G06K 19/06168; G06K 19/06075; G06K 19/06131; G06K 19/0614; G06K 19/06103
(Continued)

(56) References Cited

U.S. PATENT DOCUMENTS 3,643,068 A    2/1972   Mohan et al.
3,752,961 A    8/1973   Torrey
(Continued)

FOREIGN PATENT DOCUMENTS

CN    106447001 A    2/2017
JP    2007-003233    1/2007
(Continued)

OTHER PUBLICATIONS

International Search Report and Written Opinion, issued by the International Searching Authority (ISA/KR) in Application No. PCT/US2018/030197 dated Aug. 10, 2018. 11 pages.
(Continued)

*Primary Examiner* — Daniel A Hess
(74) *Attorney, Agent, or Firm* — Meunier Carlin & Curfman LLC (57) ABSTRACT

An object with an icon thereon encodes a bit sequence. The icon comprises a plurality of concentric rings, each of the plurality of concentric rings is divided into a plurality of data sectors. Each of the plurality of data sectors is associated with a corresponding bit in the bit sequence, and each of the plurality of data sectors encodes the corresponding bit based on the presence or absence of a line segment in the sector.

(Continued)

The plurality of concentric rings further comprises at least three anchor sectors on one or more of the plurality of concentric rings, the at least three anchor sectors comprise an anchor mark. The plurality of concentric rings further comprises one or more error correction sectors, each of the one or more error correction sectors encodes a corresponding error correction bit based on the presence or absence of a line segment in the error correction sector.

20 Claims, 7 Drawing Sheets

(58) Field of Classification Search
    USPC .......................................................... 235/494
    See application file for complete search history.

(56) References Cited

U.S. PATENT DOCUMENTS

| | | |
|---|---|---|
| 4,874,936 A | 10/1989 | Chandler et al. |
| 5,554,841 A | 9/1996 | Kost et al. |
| 5,637,849 A | 6/1997 | Wang et al. |
| 5,798,514 A | 8/1998 | Domanik |
| 6,032,861 A | 3/2000 | Lemelson et al. |
| 6,088,482 A | 7/2000 | He et al. |
| 6,122,410 A | 9/2000 | Zheng et al. |
| 6,478,232 B1 | 11/2002 | Dowling |
| 6,601,772 B1 | 8/2003 | Rubin et al. |
| 6,817,539 B2 | 11/2004 | Walmsley et al. |
| 6,830,198 B2 | 12/2004 | Walmsley et al. |
| 6,857,571 B2 | 2/2005 | Walmsley et al. |
| 7,025,279 B2 | 4/2006 | Walmsley et al. |
| 7,073,724 B2 | 7/2006 | Walmsley et al. |
| 7,143,944 B2 | 12/2006 | Lapstun et al. |
| 7,152,805 B2 | 12/2006 | Walmsley et al. |
| 7,175,097 B2 | 2/2007 | Walmsley et al. |
| 7,182,267 B2 | 2/2007 | Walmsley et al. |
| 7,264,173 B2 | 9/2007 | Lapstun |
| 7,270,277 B1 | 9/2007 | Koziol |
| 7,287,706 B2 | 10/2007 | Walmsley et al. |
| 7,290,720 B2 | 11/2007 | Walmsley et al. |
| 7,310,157 B2 | 12/2007 | Walmsley et al. |
| 7,380,727 B2 | 6/2008 | Lapstun |
| 7,431,219 B2 | 10/2008 | Lapstun |
| 7,464,881 B2 | 12/2008 | Walmsley et al. |
| 7,581,683 B2 | 9/2009 | Walmsley et al. |
| 7,621,459 B2 | 11/2009 | Hovis |
| 7,677,463 B2 | 3/2010 | Lapstun |
| 7,770,804 B2 | 8/2010 | Walmsley et al. |
| 7,784,703 B2 | 8/2010 | Walmsley et al. |
| 7,878,404 B2 | 2/2011 | Napper et al. |
| 7,878,415 B2 | 2/2011 | Hovis |
| 7,900,848 B2 | 3/2011 | Lapstun |
| 7,901,945 B2 | 3/2011 | Meiring |
| 7,918,404 B2 | 4/2011 | Lapstun |
| 7,997,504 B2 | 8/2011 | Walmsley et al. |
| 8,100,340 B2 | 1/2012 | Lapstun |
| 8,155,312 B2 | 4/2012 | Javidi et al. |
| 8,194,914 B1 | 6/2012 | Skogg et al. |
| 8,416,188 B2 | 4/2013 | Newman et al. |
| 8,424,774 B2 | 4/2013 | Lapstun |
| 8,517,281 B2 | 8/2013 | Rupp |
| 8,534,565 B2 | 9/2013 | Lin et al. |
| 8,561,906 B2 | 10/2013 | Rudeen |
| 8,757,490 B2 | 6/2014 | Lemma et al. |
| 9,111,164 B1 | 8/2015 | Anderton et al. |
| 9,268,984 B2 | 2/2016 | Jarisch et al. |
| 9,418,271 B2 | 8/2016 | Doraiswamy et al. |
| 9,424,504 B2 | 8/2016 | Annamalai et al. |
| 9,483,718 B1 | 11/2016 | Guenter et al. |
| 9,501,679 B2 | 11/2016 | Doraiswamy et al. |
| 9,562,998 B2 | 2/2017 | Edmonds et al. |
| 9,569,710 B1 | 2/2017 | Guenter et al. |
| 9,582,699 B2 | 2/2017 | Jarisch et al. |
| 9,607,199 B2 | 3/2017 | Stein |
| 9,659,201 B2 | 5/2017 | Yoshida et al. |
| 9,659,244 B2 | 5/2017 | Anderton et al. |
| 2005/0006454 A1 | 1/2005 | Silverbrook et al. |
| 2006/0091226 A1 | 5/2006 | Walmsley et al. |
| 2012/0256008 A1 | 10/2012 | Tsai et al. |
| 2015/0351583 A1 | 12/2015 | Weigelt et al. |

FOREIGN PATENT DOCUMENTS

| | | |
|---|---|---|
| KR | 10-2005-0119807 | 12/2005 |
| KR | 10-2009-0128751 | 12/2009 |
| WO | 2016-173735 | 11/2016 |

OTHER PUBLICATIONS

International Preliminary Report on Patentability, issued by the International Bureau of WIPO in Application No. PCT/US2018/030197 dated Feb. 6, 2020. 7 pages.

Extended European Search Report for Application No. 18838042.2 dated Mar. 15, 2021.

METHOD AND APPARATUS FOR ENCODING AND DECODING CIRCULAR SYMBOLIC CODES

CROSS REFERENCE TO RELATED APPLICATIONS

This application is a national stage application filed under 35 U.S.C. of PCT/US2018/030197 on Apr. 30, 2018, which claims the benefit of U.S. Provisional Patent Application Ser. No. 62/538,121 filed Jul. 28, 2017, the disclosures of which are expressly incorporated herein by reference.

BACKGROUND

Machine readable codes have become ubiquitous data communication mechanisms. Machine-readable codes may contain product or brand information such as a universal product code (UPC) number, a brand website URL, nutrition information of a product, or the like. On product packaging, UPC barcodes are most prevalent, but are limited in the amount of information that they convey about a product. Typically, the barcodes may only contain information about the manufacturer and an identification of the product. More information may be encoded in other known machine-readable codes, such as quick response (QR) codes to facilitate more rich consumer experiences with the products. However, QR codes and other similar machine-readable codes take up valuable packaging real estate and visually contrast with the design aesthetic of the graphics on the packaging despite efforts to incorporate colors and graphics into the QR codes.

SUMMARY

Aspects of the pending disclosure provide for an object with an icon thereon, the icon encoding a bit sequence. The icon comprises a plurality of concentric rings. Each of the plurality of concentric rings is divided into a plurality of data sectors. Each of the plurality of data sectors is associated with a corresponding bit in the bit sequence, and each of the plurality of data sectors encodes the corresponding bit based on the presence or absence of a line segment in the sector. The plurality of concentric rings further comprise at least three anchor sectors on one or more of the plurality of concentric rings, the at least three anchor sectors comprise an anchor mark.

In some aspects, each of the at least three anchor sectors are in a different quadrant of the one or more of the plurality of concentric rings. The one or more of the plurality of concentric rings is an outer most one of the plurality of concentric rings. The anchor mark is embedded within the one or more of the plurality of concentric rings. The anchor mark is a sequence of two or more dots.

In some aspects, a fourth anchor sector on one of the plurality of concentric rings is assigned to a second anchor mark that is distinct from the anchor mark. The anchor mark is a sequence of two dots and the second anchor mark is a sequence of three dots.

In some aspects, the plurality of concentric rings further comprises one or more error correction sectors, each of the one or more error correction sectors encodes a corresponding error correction bit based on the presence or absence of an arc in the error correction sector. The icon further comprises a graphics region within a central area of the plurality of concentric rings. The icon is marked on the object by one or more of printing, embossing, etching, or engraving the icon on the object.

In some aspects, the icon comprises a foreground color that visually marks the arc in one or more of the plurality of sectors on each of the plurality of concentric rings. The icon further comprises a background color that contrasts with the foreground color. The background color matches a color of graphics on the object. The object is a food or beverage product package. Each of the plurality of rings has the same number of data sectors.

Aspects of the pending disclosure also provide an icon encoding a bit sequence. The icon comprises a plurality of concentric rings. Each of the plurality of concentric rings is divided into a plurality of data sectors, each of the plurality of data sectors is associated with a corresponding bit in the bit sequence, and each of the plurality of data sectors encodes the corresponding bit based on the presence or absence of a line segment in the sector. An outer most one of the plurality of concentric rings further comprises at least three anchor sectors, the at least three anchor sectors comprise an anchor mark embedded within the out most one of the plurality of concentric rings.

In some aspects, each of the at least three anchor sectors are in a different quadrant of the one or more of the plurality of concentric rings. The anchor mark is a sequence of two or more dots. The plurality of concentric rings further comprises one or more error correction sectors, each of the one or more error correction sectors encodes a corresponding error correction bit based on the presence or absence of an arc in the error correction sector. The icon further comprises a graphics region within a central area of the plurality of concentric rings.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Product packaging typically includes UPC barcodes that identify the manufacturer and product. However, the graphics of product packaging change seasonally and/or with the execution of promotional campaigns for the same product. In order to provide richer interactive consumer experiences with the packaging, additional information is needed about which graphics are being used on the product packaging.

Some manufacturers may include a serial number on products that is unique to the product and graphics shown on the product. The Coca-Cola Company uses a CCATS number on product packaging to uniquely identify which graphics are present on a particular product. For example, the CCATS number 2016-00932 uniquely identifies graphics for a 8.5 oz aluminum bottle of COCA-COLA featuring polar bears that was used during a Christmas promotional campaign in 2016. The CCATS number therefore identifies the size of packaging (e.g., 8.5 oz, 12 oz, etc.), type of packaging (e.g., aluminum bottle, PET bottle, aluminum can, etc.), brand of product, graphics features on the packaging, when the graphics were used with the packaging, and the promotional campaign associated with the graphics. The CCATS number is typically printed as small text in an unobtrusive location on the product packaging that is not readily machine-readable nor recognizable by consumers as significant to the product packaging.

Embodiments of the present disclosure provide for a machine-readable icon that is visually consistent with product branding and facilitates not only identification of a brand of a product, but also identification of the particular graphics used on the packaging. The machine-readable icon features concentric rings of line segments or arcs that encode data in the icon. The concentric rings may surround a central graphics area that may feature branding graphics for a product within the icon. Each ring of data is divided into a plurality of sectors, each sector associated with a corresponding bit. The bit value of each bit is encoded by the presence or absence of a line segment or arc in the sector corresponding to the bit. For example, a sector on a ring may be assigned a bit value of "0" if the sector does not include a line segment, and assigned a bit value of "1" if the sector does include a line segment, or vice versa. In some implementations, the choice of whether a line segment encodes a value of "0" or "1" is based on anticipated occurrences of the value "0" and "1" in bit strings to be encoded by the icon. If more "0" values are anticipated to occur, then a line segment may encode the "0" value. Otherwise, if more "1" values are anticipated to occur, then a line segment may encode the "1" value. A plurality of the bits within the icon may be assigned as error correction bits. At least three of the sectors on one or more of the concentric rings are assigned to anchor marks. The anchors are present in different quadrants of the ring. In some embodiments, the anchors are present in three sectors in different quadrants of the outermost ring. The anchor mark may be a sequence of dots on the ring. In this way, the anchors are embedded within and visually consistent with the icon.

Figure 1:
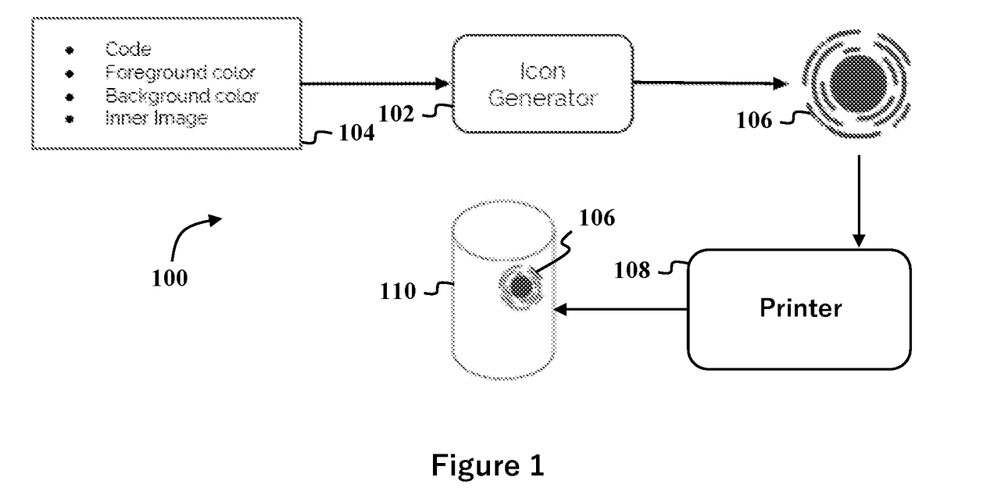
FIG. 1 illustrates an exemplary icon generator system suitable for implementing several embodiments of the disclosure.

FIG. 1 illustrates an exemplary icon generator system 100 suitable for implementing several embodiments of the disclosure. The icon generator system 100 includes an icon generator 102, a printer 108, and product packaging 110. The icon generator 102 may receive input data 104 that is to be encoded into the icon, such as a code. In some embodiments, the code is a CCATS code as described above. The input data 104 may also include visual specifications for the icon such as a foreground color, background color, and inner image file. The icon generator 102 generates an icon 106. The size of the icon 106 may be scaled to a size appropriate for the packaging on which the icon will be printed. For example, the icon 106 may be scaled to a first size for use on primary product packaging and scaled to a second size for secondary product packaging, where the first size is smaller than the second size. The icon 106 is supplied to a printer 108 along with other graphics to be printed on product packaging 110. The icon 106 may be embedded within a graphics file along with the other graphics or provided as a separate graphics file. Accordingly, the printer 108 may print the icon on the product packaging 110 at the same time as printing the other graphics or after printing the other graphics.

While described in various examples as encoding CCATS data for use on product packaging, the machine-readable icon disclosed here can encode any data and be printed, embossed, etched, engraved, or otherwise visually marked on any substrate or object. The icon may be visually perceptible to people as well as machines or may only be perceptible by machines. For example, the icon may be printed on an object in UV or IR fluorescing ink or otherwise marked on an object in a manner that is not visually perceptible to a person.

In some implementations, the icon 106 may be a static icon. That is, rather than having different icons encode different data, a single icon can be used to represent all products of a particular manufacturer or all products of a particular brand.

Figure 2:
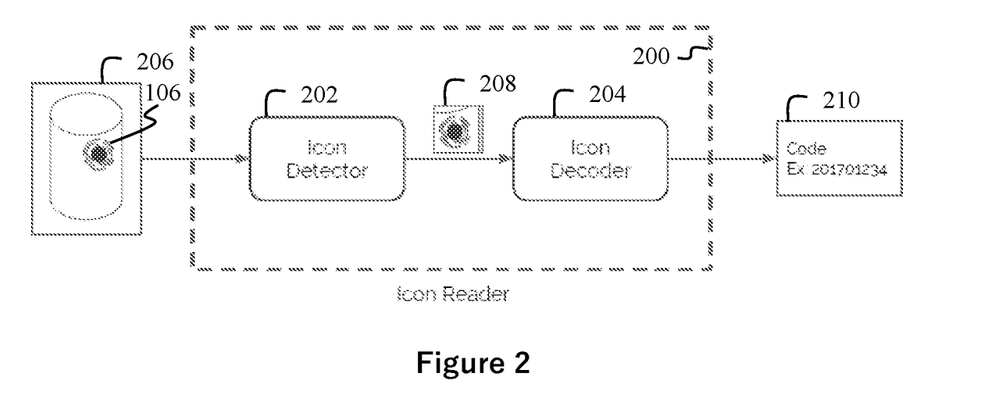
FIG. 2 illustrates an exemplary icon reader system suitable for implementing several embodiments of the disclosure.
Figure 7:
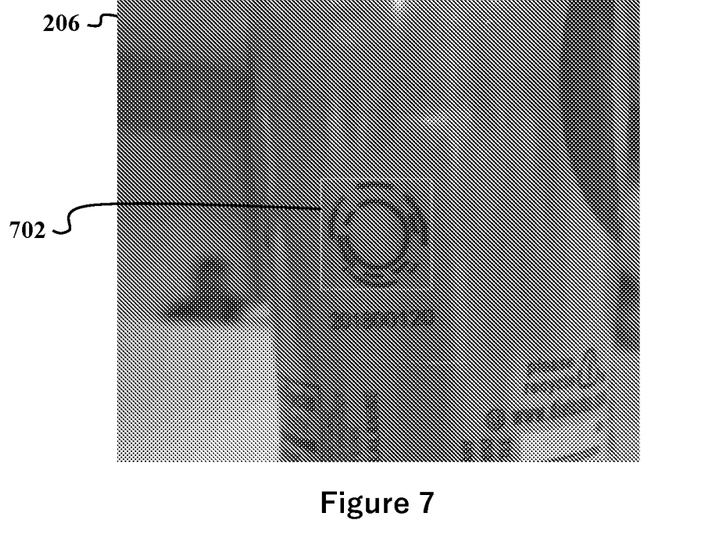
FIG. 7 illustrates an exemplary image with an icon therein suitable for implementing several embodiments of the disclosure.

FIG. 2 illustrates an exemplary icon reader 200 suitable for implementing several embodiments of the disclosure. The icon reader 200 includes an icon detector 202 and an icon decoder 204. The icon detector 202 is configured to receive an input image 206 and detect the icon 106 within the input image 206. An example of the image 206 according to various embodiments of the disclosure is shown in FIG. 7. The icon detector 202 is further configured to produce a cropped image 208 of a portion of the input image 206 that includes the icon 106. The icon decoder 204 is configured to receive the cropped image 208 with the detected icon 106 and decode the icon to extract a code 210.

Figure 3:
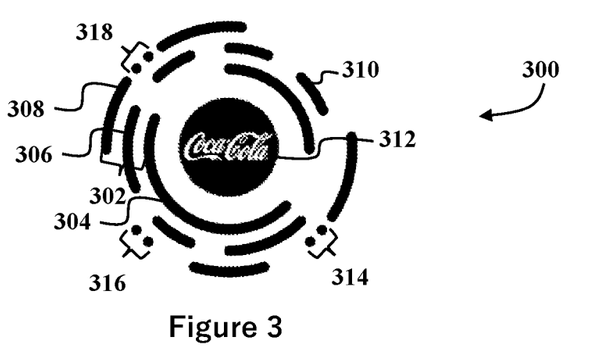
FIG. 3 illustrates an exemplary icon suitable for implementing several embodiments of the disclosure.

FIG. 3 illustrates an exemplary icon 300 suitable for implementing the icon 106 according to several embodiments of the disclosure. The icon 300 includes a plurality of concentric rings 302 that visually encode data. As shown in FIG. 3 there are three rings 302 of data, including an innermost ring 304, a middle ring 306, and an outermost ring 308. Other numbers of rings 302 may be present on the icon 300. For example, the icon 300 may include one or more rings 302, two or more rings 302, or three or more rings 302. For large amounts of data, the icon 300 may include five or more rings 302.

Each of the rings 302 includes one or more line segments or arcs, such as line segment 310, that visually encode data in the icon 300. As described in more detail below, each of the rings 302 is divided into a plurality of data sectors, each data sector associated with a corresponding bit in a bit sequence. The bit value of each bit is encoded by the presence or absence of a line segment or arc, such as line segment 310, in the sector corresponding to the bit. For example, a sector on a ring may be assigned a bit value of "0" if the sector does not include a line segment and assigned a bit value of "1" if the sector does include a line segment, or vice versa. The rings 302 also include one or more error correction sectors. Each of the one or more error correction sectors encodes a corresponding error correction bit based on the presence or absence of a line segment or arc in the error correction sector.

The concentric rings 302 may surround a central graphics area 312 that may feature branding graphics for a product within the icon 300. In some implementations, the central graphics area 312 may be blank, have a color of the foreground color of the icon 300, or have a color of the background color of the icon 300.

At least three of the sectors on one or more of the concentric rings 302 are assigned to anchors 314, 316, 318. As described in more detail below, the anchors 314, 316, 318 facilitate the icon decoder 204 to correct the perspective and orientation of the icon 106 in the cropped image 208. As shown in FIG. 3, the anchors 314, 316, 318 are present in the outer most ring 308. In some implementations, the anchors 314, 316, 318 may be present on another of the rings 302 than the outer most ring 308. In some implementations, the anchors 314, 316, 318 may be present on different ones of the rings 302. For example, the anchor 314 may be on the outer most ring 308, the anchor 316 may be present on the middle ring 306, and the anchor 318 may be present on the inner most ring 304. Other combinations of anchors 314, 316, 318 and rings 302 may be used.

The anchors 314, 316, 318 are present in different quadrants of the one or more rings 302. The anchor 314 is in the second quadrant (e.g., from 90° to 180° around the icon 300), anchor 316 is in the third quadrant (e.g., from 180° to 270° around the icon 300), and anchor 318 is in the fourth quadrant (e.g., from 270° to 360° around the icon 300). In some implementations, the anchors 314, 316, 318 may be present in different quadrants than those shown in FIG. 3. For example, the anchors 314, 316, 318 may be present in the first quadrant (e.g., from 0° to 90° around the icon), the second quadrant, and the third quadrant. Other sets of three out of the four quadrants may be used.

The anchors 314, 316, 318 are marked as a sequence of dots. As shown in FIG. 3 each of the anchors 314, 316, 318 are marked as a sequence of two dots. Other sequences can be used, such as one dot, three dots, four dots, or more. Other shapes may be used to mark the anchors 314, 316, 318 such as a square, triangle, star, or other visually distinct shape. By using sequences of dots, the anchors 314, 316, 318 can be embedded within the rings 302 of the icon 300. Therefore, the anchors 314, 316, 318 are visually consistent with the other features of the icon 300.

Figure 4:
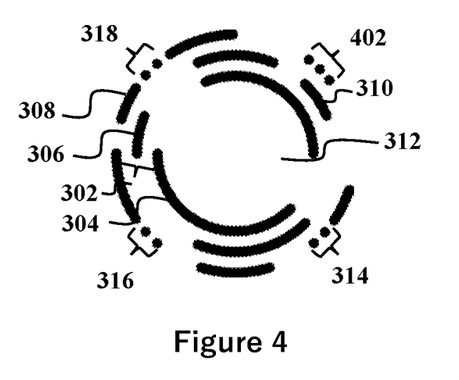
FIG. 4 illustrates an exemplary icon with a fourth anchor suitable for implementing several embodiments of the disclosure.

FIG. 4 illustrates an exemplary icon 400 suitable for implementing the icon 106 according to several embodiments of the disclosure. The icon 400 includes features substantially identical to the features described above with reference to icon 300 except that the icon 400 also includes a fourth anchor 402. The icon 402 also has a blank central graphics area 312 and visually encodes a different code than the icon 300. As shown in FIG. 4, the fourth anchor 402 is marked as another sequence of dots, this time three dots. Therefore, the anchor 402 has a different number of dots than the other anchors 314, 316, 318. In some implementations, the anchor may have the same number of dots than the other anchors 314, 316, 318. Other numbers of dots may be used in the sequence for the fourth anchor 402, such as one dot, two dots, or four or more dots. The fourth anchor 402 is present in a quadrant of the icon 400 that is different than the other anchors 314, 316, 318. Accordingly, the icon 400 includes an anchor in each of the four quadrants of the icon 400. While the anchor 402 is shown as being in the first quadrant of the icon 400, the anchor 402 may be located in different quadrants of the icon.

Figure 5:
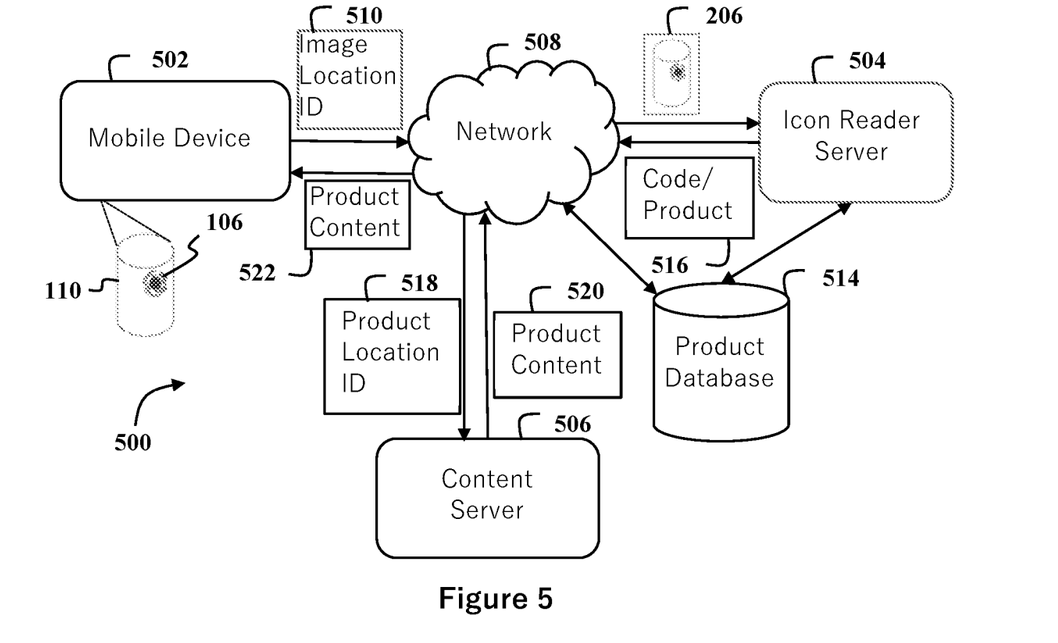
FIG. 5 illustrates an exemplary content management system suitable for implementing several embodiments of the disclosure.

FIG. 5 illustrates an exemplary content management system 500 suitable for implementing several embodiments of the disclosure. The content management system 500 includes a mobile device 502, an icon reader server 504, and a content server 506 that communicate together via a network 508. The network 508 may include a combination of one or more wired and/or wireless technologies for one or more local area network (LAN), wide area network (WAN), metro area network (MAN), cellular network(s), the internet, or any other such networking technology for communicating data between computing devices. The mobile device 502 may be a cellular telephone, tablet, laptop computer, personal computer or any other such device with a camera and access to the network 508.

The mobile device 502 is configured to capture an image 206 of product packaging 110 with the icon 106 printed thereon. The mobile device transmits image data 510 to one or more server via the network 508 and receives product content 522 in response. The image data 510 includes the image 206 in which the icon 106 is featured on the product packaging 110. The image data 510 may also include additional information about the mobile device 502 and/or a user of the mobile device 502 such a location of the mobile device 502 or an identifier of the user. Other information may be included in the image data 510 that may facilitate delivery of customized or otherwise context appropriate product content 522.

For example, upon navigating to a website via a browser on the mobile device 502, a web app hosted via the website may configure the mobile device 502 to provide access to the camera on the mobile device 502. The mobile device 502 may then be configured to transmit an image of the product packaging 510 with the icon 106 thereon. In some implementations, the mobile device 502 may periodically transmit an image over the network 508 until the icon 106 is detected or the web app times out.

In this example, the icon 106 may encode the CCATS number 2016-00932. In other examples, different product-specific information or other information unrelated to the product may be encoded by the icon 106. Accordingly, the mobile device 502 receives product content 522 associated with Christmas or polar bears and the COCA-COLA brand. For example, based on a user ID transmitted in the image data 510, it may be determined that the user of the mobile device 502 has participated with prior product campaigns associated with the World Wildlife Fund. Accordingly, the product content 522 may include a website with an article featuring the Arctic Home campaign collaboration between The Coca-Cola Company and the World Wildlife Fund. In another example, based on the location of the mobile device 502, it may be determined that the user is at a Christmas market. Accordingly, the product content 522 may include a Christmas-themed video featuring the COCA-COLA brand.

The mobile device 502 may communicate the image data 510 to a content server 506. The content server may extract the image 206 from the image data 510 and communicate the image 206 to the icon reader server 504 for decoding. The icon reader server 504 hosts an instance of the icon reader 200 thereon. In some implementations, the content server 506 and the icon reader server 504 may be combined together in a single server. In other implementations, the functions of the icon reader server 504 may be performed by an application installed on the mobile device 502. Regardless of the implementation, the icon reader server 504 receives the image 206 captured by the mobile device 502.

The icon reader server 504 processes the image 206 to decode the data visually encoded by the icon 106. The extracted code is used to look up product specification data associated with the product packaging 110 from a product database 514. For example, the product specification data may include the size of product packaging 110, type of material of the product packaging 110, brand of product in the product packaging 110, graphics features on the product packaging 110, when the graphics were used with the product packaging 110, and the promotional campaign associated with the graphics on the product packaging 110.

The icon reader server 504 transmits product information 516 back to the content server 506, the mobile device 502, or other device. For example, the product information 516 may include the extracted code and/or the product specification data looked up from the product database 514. When the product information 516 includes the extracted code, the content server 506, the mobile device 502, or other device may use the extracted code to look up the product specification data from the product database 514.

The content server 506 receives product content request information 518. The product content request information 518 includes the product information 516 from the icon reader server 504 as well as the image data 510 other than the image 206. The content server 506 determines appropriate content 520 to serve to the mobile device 502 for consumption thereon.

Figure 6:
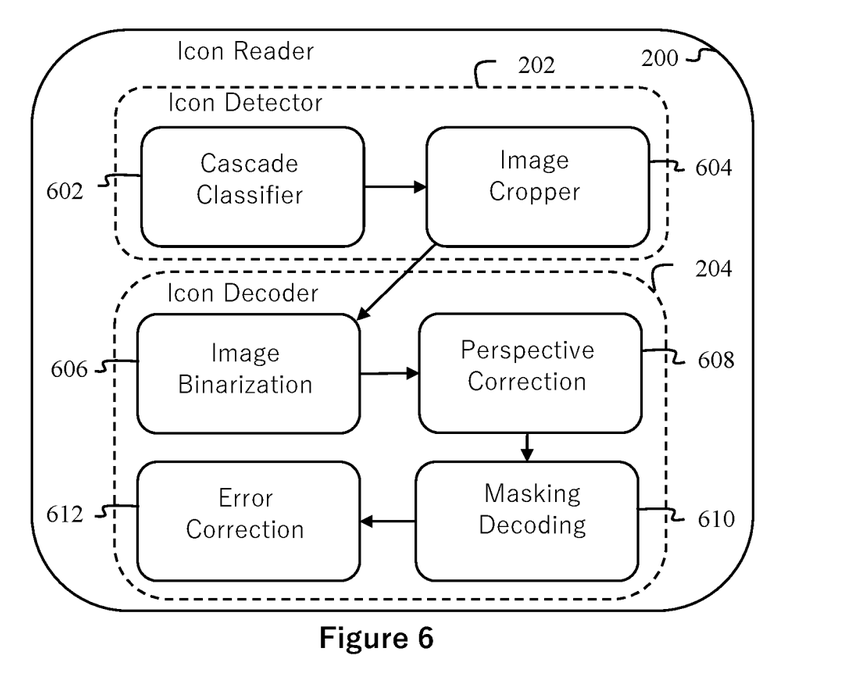
FIG. 6 illustrates an exemplary icon detector and icon decoder of the icon reader of FIG. 2.

FIG. 6 illustrates an exemplary icon detector and icon decoder of the icon reader 200 of FIG. 2. As discussed above, the icon reader 200 includes the icon detector 202 and the icon decoder 204. The icon detector 202 includes a cascade classifier 602 and an image cropper 604. The cascade classifier 602 processes the image 206 to identify an area in the image 206 in which the icon 106 is featured. For example, the cascade classifier 602 may use a Haar cascade classifier to identify the area in the image 206 in which the icon 106 is featured. For example, as shown in FIG. 7, the cascade classifier 602 may identify the area 702 as including the icon 106. The image cropper 604 crops the image 206 so that only the area 702 is present in the cropped image 208. The cropped image 208 is fed to the icon decoder 204 for extracting the code.

Figure 8:
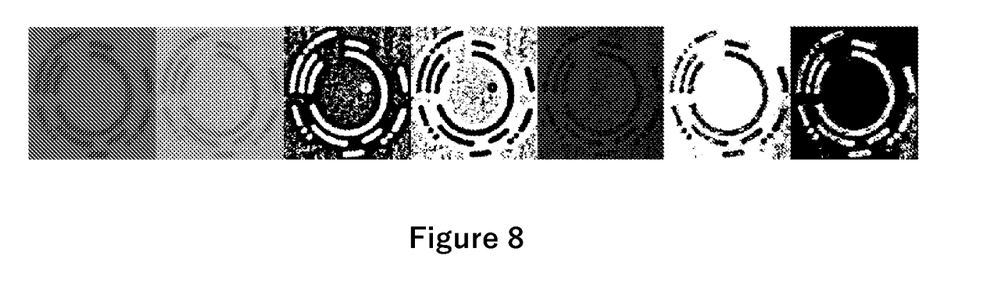
FIG. 8 illustrates an exemplary image binarization sequence suitable for implementing several embodiments of the disclosure.

The image decoder 204 includes an image binarization element 606, a perspective correction element 608, a masking and decoding element 610, and an error correction element 612. The image binarization element 606 receives the cropped image 208 and binarizes the image. For example, as shown in FIG. 8, the cropped image 208 may be processed through a sequence of processing steps. In some implementations, the image binarization element 606 may include steps of simple image binarization, BGR2Gray to convert the cropped image 208 to a grayscale image, masked Otsu to convert the grayscale image to a binary image, push or invert the binary image, and erode the inverted binary image to highlight the features of the code. The output of the image binarization element 608 produces an image with the code split out from all other features that may be present in the cropped image 208.

Figure 9:
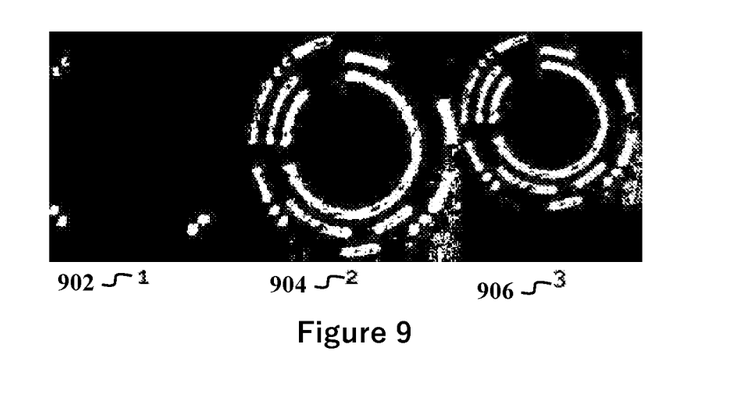
FIG. 9 illustrates an exemplary perspective correction sequence suitable for implementing several embodiments of the disclosure.

The perspective correction element 608 receives the binarized image and performs perspective and rotation corrections on the image. For example, FIG. 9 illustrates an exemplary perspective correction sequence where the perspective correction element 608 first detects the anchors 314, 316, 318 in the binarized image at 904. The perspective correction element 608 next performs perspective correction on the binarized image based on the detected anchors 314, 316, 318 at 906. Finally, the perspective correction element 608 performs image rotation to ensure that the anchors 314, 316, 318 are located at preset locations at 906. The perspective correction element 608 may also perform other image processing functions, such as image resizing and/or scaling to facilitate aligning the code present in the processed image with a decoding mask, described in more detail below.

Figure 10:
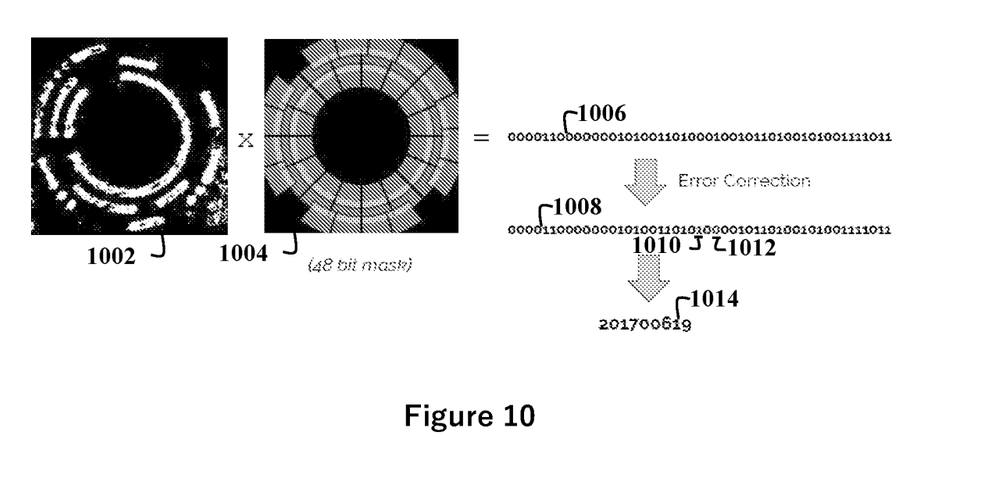
FIG. 10 illustrates an exemplary masking, decoding, and error correction sequence suitable for implementing several embodiments of the disclosure.

The masking and decoding element 610 receives the corrected code image 1002 and applies a decoding mask 1004 to the corrected code image 1002. The decoding mask 1004 specifies the locations of each of the sectors on each of the rings 302 of the icon 106. FIG. 10 illustrates an exemplary masking, decoding, and error correction sequence. As shown in FIG. 10, the decoding mask 1004 includes blank spaces at the locations of the anchors 314, 316, 318. The decoding mask 1004 shown in FIG. 10 defines 48 sectors for extracting bit values from the icon 106. The masking and decoding element 610 examines each of the sectors in the decoding mask 1004 in a predetermined bit sequence to determine whether or not a line segment is present in the sector. For example, if a line segment is determined to be present in a sector, the masking and decoding element 610 may decode the sector as having a bit value of "1". If a line segment is determined to not be present in a sector or a sector is otherwise determined to be blank, the masking and decoding element 610 may decode the sector as having a bit value of "0". In some implementations, the determining that a line segment is present in a sector may result in a bit value of "0" and determining that a line segment is not present in a sector or that a sector is blank may result in a bit value of "1". Upon examining all of the sectors in the decoding mask 1004, the masking and decoding element 610 generates a bit sequence 1006.

Figure 11:
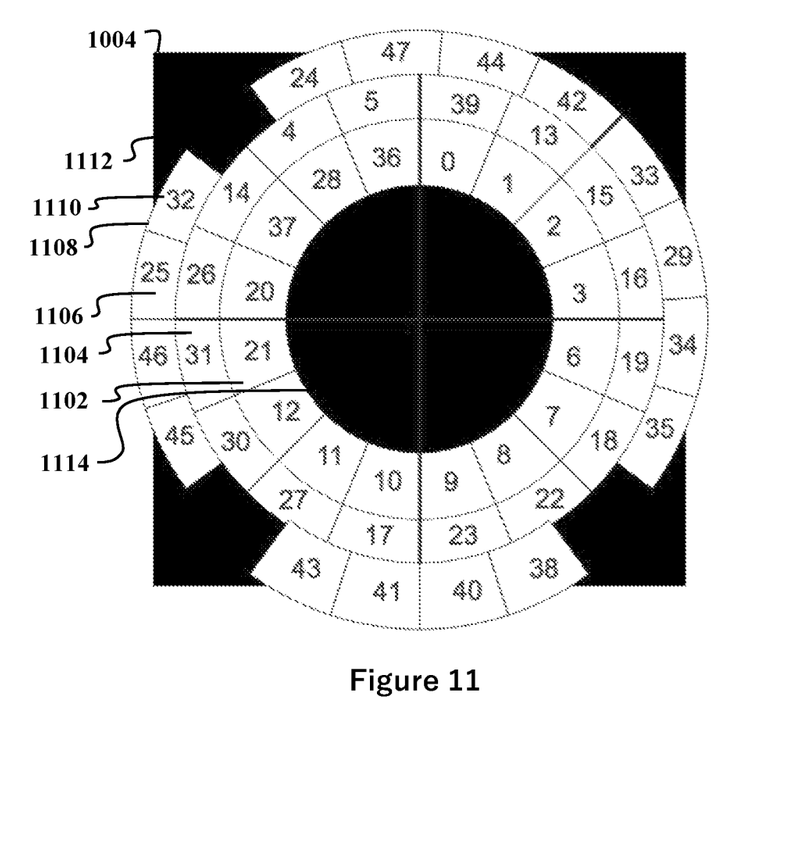
FIG. 11 illustrates an exemplary decoding mask suitable for implementing several embodiments of the disclosure.

FIG. 11 shows an illustrative decoding mask 1004 according to various implementations of the disclosure. Similar to the structure of the icon 300 described above, the decoding mask has three rings of sectors, including an innermost ring 1102, a middle ring 1104, and an outermost ring 1106. Other numbers of rings may be present on the decoding mask 1004 to match the number of rings present on the icon 300.

Each of the rings includes a plurality of sectors for decoding distinct portions of the icon 300 depending on whether or not a line segment is present in the sector. Each of the plurality of sectors is assigned to decode a particular bit number in a bit sequence encoded by the icon 106. For example, a sector 1008 is assigned to decode bit number "32" 1110 in the decoding mask 1004 shown in FIG. 11. Therefore, when overlaying the decoding mask 1004 on the corrected code image 1002, the presence or absence of a line segment in the sector 1008 determines the value assigned to bit "32" 1110 in the output bit sequence 1006.

The decoding mask has a blank region 1114 in the center corresponding to the central graphics area 312 of the icon 300. The decoding mask 1004 also has blank sectors at locations corresponding to the locations assigned to anchors 314, 316, 318 in the icon 300. For example, sector 1112 is a blank sector represented by a black box at a location corresponding to anchor 318 in the icon 300. Because the anchors do not encode any data in the icon 106, providing blank sectors in the decoding mask 1004 at each of the anchor locations ensures that bit values are not decoded based on the presence of the anchor marks. While three blank sectors are shown in the outmost ring 1006, any number of the blank sectors may be located in any of the sectors on the decoding mask 1004 that correspond to the locations of anchors in the icon 300.

As shown in FIG. 11, the sectors of the innermost ring 1102 and the middle ring 1104 are angularly aligned to each other, whereas the sectors in the outermost ring 1106 have an angular offset with respect to the innermost ring 1102 and the middle ring 1104. For example, sectors for bit "5" from the middle ring 1104 and bit "36" from the innermost ring 1102 are aligned with one another such that the width boundaries of the sectors are aligned with a common radius from the center of the decoding mask 1004. In contrast, the sectors for bits "24" and "47" in the outermost ring 1106 have width boundaries that are aligned with a radius that is offset from the common radius. The sectors of the outermost ring 1106 have an angular offset with respect to the sectors of the innermost ring 1102 and the middle ring 1104 so as to be able to encode the same number of bits as each of the innermost ring 1102 and the middle ring 1104 while also providing sufficient space for the blank sectors at locations assigned to anchors 314, 316, 318 in the icon 300.

The distribution of which bits are assigned to which sectors in the decoding mask 1004 may be varied for a given implementation. As shown in FIG. 11 each bit may be distributed on an individual basis. In some implementations, the bits may be distributed on the decoding mask 1004 such that the number of line segments displayed is maximized for a given range of values to be encoded by the icon 106. The placement of the bits may be prioritized such that bits with the highest probability of resulting in a line segment along one or more sectors being displayed are placed on the innermost ring 1102 and the outermost ring 1106 whereas bits that have a lower probability of a line segment being displayed along one or more sectors are placed on the middle ring 1104. Additionally, the placement of bits may be prioritized such that instances of the innermost ring 1102 having uninterrupted lines across a plurality of sectors is maximized. This reduces the risk of incorrect decoding of bits on small versions of the icon 106, where the innermost ring 1102 would be smallest. For example, as shown in FIG. 3, the icon 300 has long uninterrupted line segments in the innermost and outermost rings 304, 308. In contrast, the icon 300 has several interrupted line segments in the middle ring 306.

Figure 12:
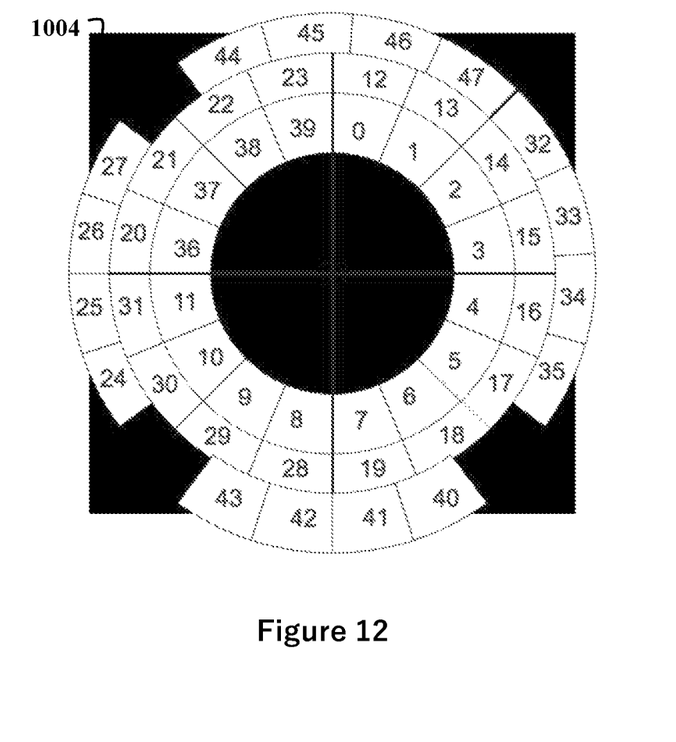
FIG. 12 illustrates another exemplary decoding mask suitable for implementing several embodiments of the disclosure.

FIG. 12 shows another illustrative decoding mask 1004 according to various implementations of the disclosure. In contrast to the distribution of bits on an individual basis as shown in FIG. 11, FIG. 12 shows a placement of words, sequences of four bits, across the decoding mask 1004. The placement of words may follow the same criteria discussed above with respect to the placement of bits in FIG. 11. Because error correction is performed on a word-by-word basis on the output bit sequence 1006, a partial occlusion in the image 206 may impact multiple words using the individual bit distribution shown in FIG. 11. The same partial occlusion may only impact a single word in the word distribution shown in FIG. 12.

The error correction element 612 receives the bit sequence 1006 generated by the masking and decoding element 610 and applies an error correction algorithm to the bit sequence. For example, the error correction element 612 may apply a Reed-Solomon error correction algorithm to the bit sequence 1006. Upon applying the error correction algorithm none, one, or more of the bits in the bit sequence 1006 may be corrected. For example, as shown in FIG. 10, bit 1010 and bit 1012 may be corrected in the bit sequence 1006 to produce an error corrected bit sequence 1008. The error corrected bit sequence 1008 may then be interpreted to produce a code 1014. For example, as shown in FIG. 10, the error corrected bit sequence 1008 may be interpreted to produce the CCATS number 2017-00619.

It should be appreciated that the logical operations described herein with respect to the various figures may be implemented (1) as a sequence of computer implemented acts or program modules (i.e., software) running on a computing device (e.g., the computing device described in FIG. 13), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 13:
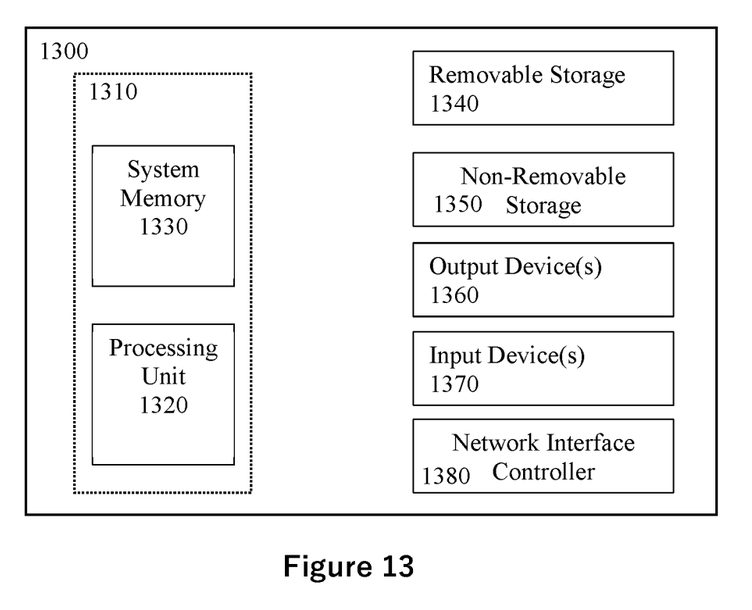
FIG. 13 illustrates an exemplary computer system suitable for implementing the several embodiments of the disclosure.

Referring to FIG. 13, an example computing device 1300 upon which embodiments of the invention may be implemented is illustrated. For example, each of the content source, key server, segmentations servers, caching servers, and client devices described herein may each be implemented as a computing device, such as computing device 1300. It should be understood that the example computing device 1300 is only one example of a suitable computing environment upon which embodiments of the invention may be implemented. Optionally, the computing device 1300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 1300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 1300 to provide the functionality of a number of servers that is not directly bound to the number of computers in the computing device 1300. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 1300 typically includes at least one processing unit 1306 and system memory 1304. Depending on the exact configuration and type of computing device, system memory 1304 may be volatile (such as random access memory (RAM)), non-volatile (such as read-only memory (ROM), flash memory, etc.), or some combination of the two. This most basic configuration is illustrated in FIG. 13 by dashed line 1302. The processing unit 1306 may be a standard programmable processor that performs arithmetic and logic operations necessary for operation of the computing device 1300. While only one processing unit 1306 is shown, multiple processors may be present. Thus, while instructions may be discussed as executed by a processor, the instructions may be executed simultaneously, serially, or otherwise executed by one or multiple processors. The computing device 1300 may also include a bus or other communication mechanism for communicating information among various components of the computing device 1300.

Computing device 1300 may have additional features/functionality. For example, computing device 1300 may include additional storage such as removable storage 1308 and non-removable storage 1310 including, but not limited to, magnetic or optical disks or tapes. Computing device 1300 may also contain network connection(s) 1316 that allow the device to communicate with other devices such as over the communication pathways described herein. The network connection(s) 1316 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1300 may also have input device(s) 1314 such as a keyboards, keypads, switches, dials, mice, track balls, touch screens, voice recognizers, card readers, paper tape readers, or other well-known input devices. Output device(s) 1312 such as a printers, video monitors, liquid crystal displays (LCDs), touch screen displays, displays, speakers, etc. may also be included. The additional devices may be connected to the bus in order to facilitate communication of data among the components of the computing device 1300. All these devices are well known in the art and need not be discussed at length here.

The processing unit 1306 may be configured to execute program code encoded in tangible, computer-readable media. Tangible, computer-readable media refers to any media that is capable of providing data that causes the computing device 1300 (i.e., a machine) to operate in a particular fashion. Various computer-readable media may be utilized to provide instructions to the processing unit 1306 for execution. Example tangible, computer-readable media may include, but is not limited to, volatile media, non-volatile media, removable media and non-removable media implemented in any method or technology for storage of information such as computer readable instructions, data structures, program modules or other data. System memory 1304, removable storage 1308, and non-removable storage 1310 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1306 may execute program code stored in the system memory 1304. For example, the bus may carry data to the system memory 1304, from which the processing unit 1306 receives and executes instructions. The data received by the system memory 1304 may optionally be stored on the removable storage 1308 or the non-removable storage 1310 before or after execution by the processing unit 1306.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An object with an icon thereon, the icon encoding a bit sequence, the icon comprising:
    a plurality of concentric rings, each of the plurality of concentric rings is divided into a plurality of data sectors, each of the plurality of data sectors is associated with a corresponding bit in the bit sequence, and each of the plurality of data sectors encodes the corresponding bit based on the presence or absence of a line segment in the sector;
    wherein the plurality of concentric rings further comprises at least three anchor sectors, each of the anchor sectors is embedded within one of the plurality of concentric rings, the at least three anchor sectors comprise an anchor mark, wherein the at least three anchor sectors with the anchor mark facilitate correction of perspective and orientation of the icon.

2. The object of claim 1, wherein each of the at least three anchor sectors are in a different quadrant of the one or more of the plurality of concentric rings.

3. The object of claim 2, wherein the one or more of the plurality of concentric rings is an outer most one of the plurality of concentric rings.

4. The object of claim 1, wherein the anchor mark is embedded within the one or more of the plurality of concentric rings.

5. The object of claim 4, wherein the anchor mark is a sequence of two or more dots.

6. The object of claim 4, wherein a fourth anchor sector on one of the plurality of concentric rings is assigned to a second anchor mark that is distinct from the anchor mark.

7. The object of claim 6, wherein the anchor mark is a sequence of two dots and the second anchor mark is a sequence of three dots.

8. The object of claim 1, wherein the plurality of concentric rings further comprises one or more error correction sectors, each of the one or more error correction sectors encodes a corresponding error correction bit based on the presence or absence of a line segment in the error correction sector.

9. The object of claim 1, wherein the icon further comprises a graphics region within a central area of the plurality of concentric rings.

10. The object of claim 1, wherein the icon is marked on the object by one or more of printing, embossing, etching, or engraving the icon on the object.

11. The object of claim 1, wherein the icon comprises a foreground color that visually marks the line segment in one or more of the plurality of sectors on each of the plurality of concentric rings.

12. The object of claim 11, wherein the icon further comprises a background color that contrasts with the foreground color.

13. The object of claim 12, wherein the background color matches a color of graphics on the object.

14. The object of claim 13, wherein the object is a food or beverage product package.

15. The object of claim 1, wherein each of the plurality of rings has the same number of data sectors.

16. The object of claim 1, wherein one or more of the at least three anchor sectors are present on a different one of the plurality of concentric rings.

17. An icon encoding a bit sequence, the icon comprising:
a plurality of concentric rings, each of the plurality of concentric rings is divided into a plurality of data sectors, each of the plurality of data sectors is associated with a corresponding bit in the bit sequence, and each of the plurality of data sectors encodes the corresponding bit based on the presence or absence of a line segment in the sector;
wherein an outer most one of the plurality of concentric rings further comprises at least three anchor sectors embedded within the outer most one of the plurality of concentric rings, the at least three anchor sectors comprise an anchor mark embedded within the outer most one of the plurality of concentric rings, wherein the icon further comprises a graphics region within a central area of the plurality of concentric rings without structure for encoding or decoding the bit sequence.

18. The icon of claim 17, wherein each of the at least three anchor sectors are in a different quadrant of the one or more of the plurality of concentric rings.

19. The icon of claim 18, wherein the anchor mark is a sequence of two or more dots.

20. The icon of claim 17, wherein the plurality of concentric rings further comprises one or more error correction sectors, each of the one or more error correction sectors encodes a corresponding error correction bit based on the presence or absence of a line segment in the error correction sector.

* * * * *